United States Patent [19]

Johnson

[11] 4,318,768
[45] Mar. 9, 1982

[54] SLIT-SEALING APPARATUS FOR HIGH-DENSITY PLASTIC SHEETS

[76] Inventor: James R. Johnson, 3819 Greenhill Dr., Chamblee, Ga. 30341

[21] Appl. No.: 200,393

[22] Filed: Oct. 24, 1980

Related U.S. Application Data

[63] Continuation-in-part of Ser. No. 118,499, Feb. 4, 1980.

[51] Int. Cl.³ .................... B32B 31/18; B32B 31/26
[52] U.S. Cl. .................................... 156/494; 156/495; 156/499; 156/515; 493/194; 493/341
[58] Field of Search ............... 156/515, 251, 271, 494, 156/495, 499; 493/197, 202, 203, 341, 194, 199, 287

[56] References Cited

U.S. PATENT DOCUMENTS

| | | | |
|---|---|---|---|
| 2,423,187 | 7/1947 | Haugh | 493/197 |
| 2,759,524 | 8/1956 | Davis | 493/341 |
| 2,781,079 | 2/1957 | Ruby et al. | 156/515 |
| 4,070,222 | 1/1978 | Olson | 156/515 |
| 4,211,599 | 7/1980 | Bolter et al. | 156/515 |
| 4,259,134 | 3/1981 | Joice et al. | 156/515 |

Primary Examiner—Michael G. Wityshyn
Attorney, Agent, or Firm—James B. Middleton

[57] ABSTRACT

Slit-sealing apparatus for high density plastic sheets is disclosed. The sheets to be slit-sealed are passed over rollers, at least one of the rollers having a brake so that the plastic is put in tension. A curved tensioning bar is urged against the sheets to deflect the sheets and increase the tension, tension being greater in the area to be slit. Slitting is accomplished by an elongate knife blade angularly disposed with respect to the web of material so that the material is slit, then the material drags along the sides of the knife blade. The knife is heated to seal the edges, and the slit edges are held in tension until they reach the next roll. The sealed edges are then heated for final setting to achieve a strong seal.

5 Claims, 5 Drawing Figures

SLIT-SEALING APPARATUS FOR HIGH-DENSITY PLASTIC SHEETS

CROSS REFERENCE TO RELATED APPLICATIONS

This application is a continuation-in-part of the application of the same inventor, titled "Slit Sealing Method and Apparatus" filed on Feb. 4, 1980, and having Ser. No. 118,499.

FIELD OF THE INVENTION

This invention relates generally to slit-sealing apparatus, and is more particularly concerned with an apparatus for slitting and sealing a high density plastic material to form a uniform cut edge with a secure seam.

BACKGROUND OF THE INVENTION

It is common practice to extrude plastic in the form of a large tube, the tube being flattened and slit longitudinally thereof, and the cut edges being sealed together to form two smaller tubes. The conventional apparatus for accomplishing this slitting and sealing comprises simply a cutting blade that is heated sufficiently to melt the plastic as the plastic moves over the blade. The most popular blade for slitting and sealing has a vertically straight, or sometimes notched, cutting edge, and has grooves on each side thereof, the plastic riding in the grooves so that a bead is rolled along the edge of the material in an effort to make a secure seal.

Many of the difficulties with the prior art slit-sealers have been solved by the method and apparatus disclosed in the above identified co-pending application; however, with the high-density plastics, the problem has not been solved. High-density plastics present additional problems in that the material is more difficult to seal. Furthermore, while high-density plastic is generally much stronger than the low-density material, once a tear is started in high-density plastic, the material continues to tear very easily. The result is that even pin holes in the seams of high-density material cannot be tolerated. Thus, with the high-density plastics, it is more difficult to seal, and the standards for the seals must be maintained at a higher level.

The prior art slit-sealing of high-density material has usually been accomplished by the same apparatus as the slit-sealing of the low-density material. The changes that have been made have usually included a higher temperature on the heated knife and/or slower film speeds to achieve a greater dwell time in an effort to get more heat into the film as it drags over the knife. Since the knife is generally heated by passing an electric current therethrough, the knife blade itself being made of nickel-chromium-steel, the higher temperature means a greater current, and the greater current is undesirable in the manufacturing environment. Also, with the higher temperature and slower speeds, the material may burn, at least in spots, causing weakened portions of the seam which can cause the material to split readily.

SUMMARY OF THE INVENTION

The present invention overcomes the above mentioned and other difficulties with the prior art by providing a generally wedge shaped, elongate knife blade angularly disposed so that the film engages the sharp edge of the knife blade and then drags along the sides of the knife blade. The knife blade extends from a knife body having heating means therein. Tensioning means are also provided for assuring that the portion of the web being cut remains under tension until the web has been cut, and the edges well sealed. A subsequent heating means may be utilized for added strength to the seal.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF AN EMBODIMENT OF THE INVENTION

Figure 1:
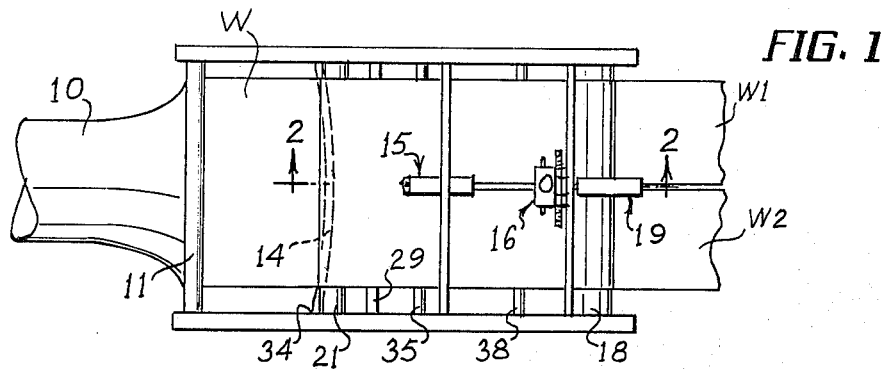
FIG. 1 is a somewhat schematic top plan view of a slit-sealing apparatus made in accordance with the present invention.

Referring now more particularly to the drawings, and to that embodiment of the invention here presented by way of illustration, FIG. 1 discloses a large tubular member 10 from a conventional extruder or the like, the tubular member 10 being flattened by appropriate rolls such as the rolls 11. From the rolls 11, the flattened tube, or the plastic sheets, pass around a pair of rolls which will be discussed in more detail hereinafter, and there may be a tensioning bar 14 between the two rolls.

The sheets next extend generally horizontally as a single web into the cutting area where there is a knife means 15 mounted to engage the web, the knife means 15 being followed by an edge tensioning means 16. The slit web then passes over a large roller 18 having heating means 19 partially surrounding the roll 18. After the roll 18, the web has been slit and sealed, and can be passed to further conventional equipment to be put into rolls for further processing, or may pass directly to other equipment for immediate processing.

It will therefore be seen from FIG. 1 that the plastic material will be extruded to create a large tubular member 10, the member being flattened by rolls 11 to be sheets of plastic for forming the web W. The web then passes around a pair of rolls and is tensioned appropriately. The web W is then slit by the heated knife means 15; and, the cut edges of the web W are held taut by the tensioning means 16 until the web is held by the large roll 18. As the slit-sealed edges of the web pass around the roll 18, the edges are heated by the seal heating means 19 to assure complete sealing of the edges. The two webs thus formed are designated as W1 and W2.

Figure 2:
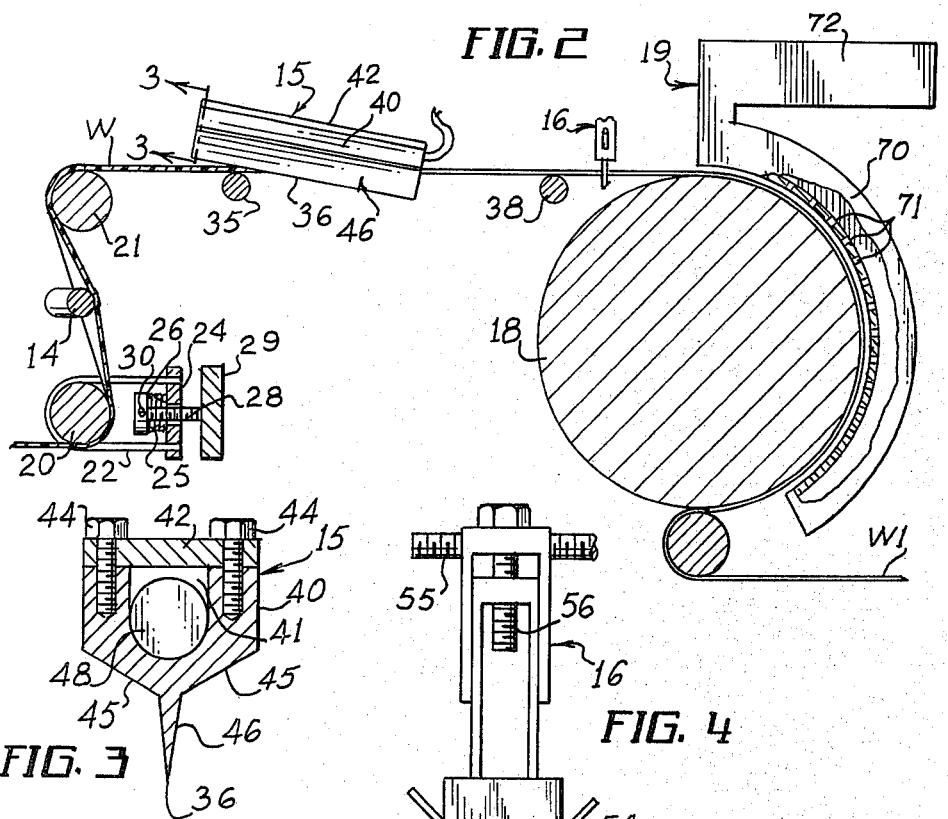
FIG. 2 is an enlarged, cross-sectional view taken substantially along the line 2—2 in FIG. 1.

Attention is next directed to FIG. 2 of the drawings for a more detailed understanding of the apparatus of the present invention. In FIG. 2 it will be seen that the two rolls over which the web W passes are designated as 20 and 21. The web W comes from the flattening rolls 11, and passes beneath the roll 20, around the roll 20, and upwardly to the roll 21. The web passes around the roll 21 and leaves the roll 21 in a generally horizontal path to approach the knife means 15.

Since the web W must be in tension at the time the web is slit by the knife means 15, it is desirable that the roll 20 have some form of braking means. While those skilled in the art can provide any of numerous forms of brakes for rolls such as the roll 20, the braking means here shown includes a strap 22 which passes around the roll 20. By holding the strap stationary while the roll 20 rotates, it will be understood that a braking force will be applied. The strap 22 is held in a block 24, the block 24 being urged away from the roll 20 by a spring 25. The spring 25 acts between a collar 26 and the block 24, the collar 26 being fixed to a shaft 28 which extends from a stationary member 29.

As here shown, the shaft 28 is threaded, and it is contemplated that the collar 26 will be threaded internally so the collar 26 can be variably positioned along the shaft 28. A set screw 30 can fix the collar in any position desired.

As a result of this arrangement it will be seen that the collar 30 can be placed as appropriate to cause the spring 25 to urge the block 24 away from the roll 20. The braking force on the roll 20 can therefore be varied at will. Also, while the braking means is shown only on the roll 20, it will be understood that comparable braking means may be placed on the roll 21 if needed, as well as on web handling means preceding the apparatus of the present invention, such as on the rolls 11 and the like.

With attention to FIGS. 1 and 2, the tensioning bar 14 is shown between the rolls 20 and 21. In FIG. 1, it will be seen that the tensioning bar 14 is fixed at each end, as at 34, and extends completely across the web W. The tensioning bar 14 is somewhat bowed so that the center portion of the tensioning bar 14 pushes against the web more than the ends of the bar. This is illustrated in FIG. 2 of the drawings, though it will be understood that the bow is somewhat exaggerated for purposes of illustration. It will be understood, nevertheless, that the object of the tensioning bar 14 is to provide additional tension on the web W, and primarily in the area of the slit-sealing. Since, in the embodiment here illustrated, the slit-sealing is performed generally in the center of the web W, the maximum tension is to be provided generally in the center of the web W.

As the web W leaves the roll 21, it will be seen that there is a transverse support, the support being here shown as a stationary support rod 35. It will be understood that the surface of the support rod 35 is round and smooth so there is very little drag with respect to the support rod 35 as the web W moves thereover.

The support rod 35 is placed immediately adjacent to the cutting edge 36 of the knife means 15. Due to the angular disposition of the knife blade, the cutting edge 36 of the knife means 15 will exert a downward force on the web W as the web W moves into the cutting edge 36; therefore, the support rod 35 is placed as close as practicable to prevent the web W from moving downwardly as the web is cut.

The web W continues past the cutting means 15, where the web W will be completely severed into the two webs W1 and W2. After the knife means 15, there is another support rod 38 similar to the support rod 35.

After the support rod 38 there is the large roll 18 over which the webs W1 and W2 pass. Between the support rod 38 and the roll 18, there is an edge tensioning means 16. The tensioning means 16 will be discussed in more detail hereinafter.

Figures 3, 4:
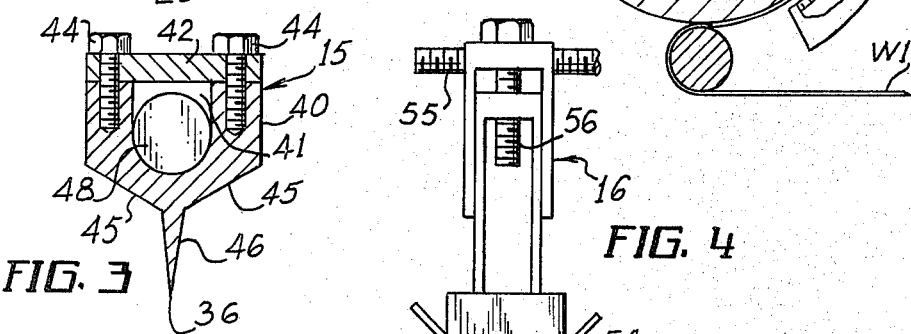
FIG. 3 is a further enlarged cross-sectional view taken substantially along the line 3—3 in FIG. 2.
FIG. 4 is a front elevational view of an edge tensioning means used with the apparatus of the present invention; and, FIG. 5 is a cross-sectional view taken generally in the plane of the top surface of the film, and showing the complete cutting device in phantom lines.

Looking at FIGS. 2 and 3 of the drawings it will be seen that the knife means 15 includes a knife body 40 having a longitudinal channel 41 therein, and a cover plate 42 to close the channel 41. As here shown, a plurality of cap screws 44 extends through the cover plate 42 and into the body 40 to secure the cover 42 to the body 40.

The lower side of the body 40 is tapered, having downwardly sloped surfaces 45 which terminate at the knife blade 46. It will be seen that the knife blade 46 extends the full length of the knife means 15, the knife blade 46 being generally wedge shaped and including the sharp edge 36.

It will now be understood that the knife means 15 has a substantially conventional electric heater 48 disposed within the channel 41. The heater 48 will heat the body 40, which will of course heat the knife 46 since the knife 46 is integrally formed with the body 40. While numerous materials may be acceptable for the knife means 15, it has been found out that cast iron works quite well because of its ability to retain heat. Materials having rapid heat transfer properties are less desirable because a fairly constant heat is preferred for better control.

Looking at FIG. 2 of the drawings, it will be seen that the knife means 15 is angularly disposed with respect to the web W so that one end of the knife blade 46 is above the web W while the opposite end of the knife blade 46 is below the web. The web W therefore moves against the sharp edge 36 of the knife 46 at an acute angle for smooth cutting, and the web is split; then, because the web is held taut, the web drags along the sides of the knife blade 46. It will then be seen that the web W leaves the knife blade 46 with the web just below the junction of the sloped surfaces 45 of the body 40 and the sides of the knife blade 46. It is during this passage across the heated knife blade 46 that the sealing of the web is effected.

Looking now at FIG. 4 of the drawings in conjunction with FIG. 2, it will be seen that the edge tension means 16 comprises a pair of angularly disposed rod members 50 and 51. In one embodiment of the invention, the rod members 50 and 51 are separate pieces of material slidably held in a block 52 by set screws 54. It will be understood, however, that the object is to provide angularly disposed members to engage the slit edges of the web, and the members 50 and 51 may be rigidly assembled, they may be the same member, or they may be integrally formed with a support means such as the block 52. Again, the function is simply to engage the slit edges of the web and maintain the tension without creating excessive drag, and virtually any mechanical device to perform this function will operate as well as the device shown.

It is important that the tensioning means 16 be accurately positionable to provide uniform tension on each of the edges. For this purpose, there is a horizontal adjusting means 55 and a vertical adjusting means 56 shown in FIG. 4. These adjusting means are shown as screws that are rotatable to adjust the posiiton of the support so that the members 50 and 51 can be placed as desired.

Figure 5:
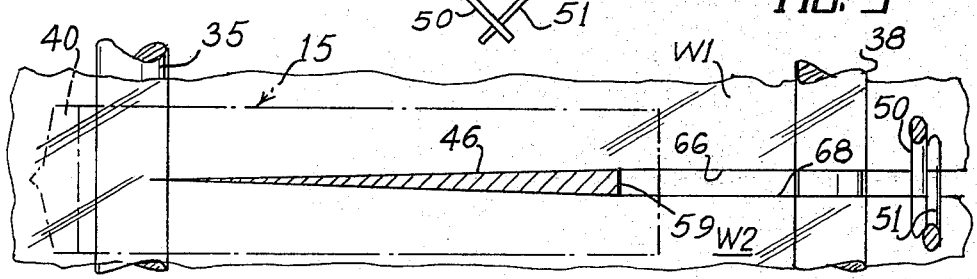

Attention is next directed to FIG. 5 of the drawings for further discussion of the slit-sealing of the high density plastic materials. In FIG. 5 it will be seen that the web W is supported by the support rod 35, and the knife blade 46 of the knife means 15 is located so that the initial cutting portion of the sharp edge 36 is closely adjacent to the support rod 35. The sharp edge 36 and the support rod 35 therefore cooperate to hold the web W while the sharp edge 36 of the knife blade 46 slits the film. As is shown in FIG. 5, the cut edges of the film then move along the sides of the knife blade 46. During this travel, the edges of the web are sealed because the knife means 15 is heated by the heater 48.

As the cut edges of the web leave the rear end 59 of the knife blade 46, the edges of the web should leave precisely in a straight line as shown. If the slit edge 60 of the web W1 is moved away from the knife blade 46, there is a tendency not to effect a complete seal on the slit edges 66. Conversely, if the edge 66 is moved towards the knife blade, it will be understood that the slit edge 66 is being dragged across the sharp corner of the knife blade 46, and this tends to damage the sealed edge. Even though the damage may amount only to pin holes, as is known in the art the presence of pin holes in high density plastic will result in easy splitting of the material.

After the webs W1 and W2 leave the knife blade 46, the webs pass over the support rod 38, then the edges 66 of web W1 and 68 of W2 are engaged by the tensioning rods 50 and 51. These rods 50 and 51 prevent random motion of the edges 66 and 68 which, again, has been found to reduce damage to the sealed edges 66 and 68.

The tensioning means 16 retains the tension in the webs W1 and W2 until the webs pass onto the large roll 18. The large roll 18 is provided with heating means 19 as disclosed in the above identified co-pending application. Briefly, the heating means 19 includes a manifold 70 having a plurality of holes 71 therein, the holes 71 directing air from the manifold 70 onto the roll 18. The manifold 70 is supplied with heated air through heaters indicated at 72. Further details of this arrangement are shown in the co-pending application and no further description is thought to be necessary.

Though the precise mechanism is not totally understood, it has been found that the use of the heating means 19 after slit sealing by the knife means 15 tends to improve the seal. It is thought that the process may be somewhat akin to an annealing process, the plastic being held at a slightly elevated temperature until the material is well set. It is also contemplated that heating means other than the manifold 70 may be used; for example, the roll 18 may be heated by numerous other means to achieve the same result.

In normal operation of the above described device it is contemplated that the heating means 19 would be relatively permanently placed with respect to the roll 18. The tensioning means 16 and knife means 15 would then be generally aligned with the heating means 19, and the web W would be threaded through the device as shown. Once the knife means 15 has slit the web W and the webs W1 and W2 are extended over the roll 18, the alignment of the tensioning means 16 and knife means 15 can be done more accurately. As a final step, it will be remembered that an edge that pulls away from the knife means tends not to be sealed, and an edge that moves into the knife blade tends to have pin holes as a result of damage from being dragged across the corner of the knife blade. Thus, the edges 66 and 68 can be examined, and the knife means 15 and tensioning means 16 can be adjusted appropriately until the edges show perfect sealing. Also, it will be obvious that the arrangement shown is designed to slit one tube 10 into two tubes W1 and W2, while those skilled in the art will recognize that the system can be duplicated to slit a single tubular extrusion into three or more smaller tubes as may be desired.

It will of course be understood by those skilled in the art that the particular embodiment of the invention here presented is by way of illustration only and is meant to be in no way restrictive; therefore, numerous changes and modifications may be made, and the full use of equivalents resorted to, without departing from the spirit or scope of the invention as defined in the appended claims.

I claim:

1. Apparatus for slit-sealing high density plastic sheets including means for holding said plastic sheets in a generally flat web, knife means engaging said web, and tensioning means for maintaining said web in tension, said knife means including a knife body, and an elongate knife blade fixed to said body and having a sharp edge, a first end of said sharp edge being above said web and a second end of said sharp edge being below said web, so that said elongate knife blade passes through the plane of said web for slitting said web, and said sharp edge forms an acute angle with the upper surface of said web, and heating means for heating said knife means sufficiently that said web is sealed while in engagement with said knife blade, said means for holding said plastic sheets in a generally flat web including a plurality of rollers, a first roller and a second roller of said plurality of rollers having tangents defining the plane of said web, a third roller of said plurality of rollers being adjacent to said first roller and spaced from said plane of said web, said tensioning means including braking means on at least one roller of said first roller and said third roller, said tensioning means further including a tensioning bar located between said first roller and said third roller, said tensioning bar being located to deflect said plastic sheets to increase the tension, said tensioning bar being curvilinear for deflecting some portions of said web more than other portions of said web, said some portions of said web being aligned with said knife means.

2. Apparatus for slit-sealing high density plastic sheets including means for holding said plastic sheets in a generally flat web, knife means engaging said web, and tensioning means for maintaining said web in tension, said knife means including a knife body, and an elongate knife blade fixed to said body and having a sharp edge, a first end of said sharp edge being above said web and a second end of said sharp edge being below said web, so that said elongate knife blade passes through the plane of said web for slitting said web, and said sharp edge forms an acute angle with the upper surface of said web, and heating means for heating said knife means sufficiently that said web is sealed while in engagement with said knife blade, said means for holding said plastic sheets in a generally flat web including a plurality of rollers, a first roller and a second roller of said plurality of rollers having tangents defining the plane of said web, said tensioning means including edge tensioning means adjacent to said second roller of said plurality of rollers, said edge tensioning means being located to deflect the slit edges of said web for maintaining tension in said slit edges.

3. Apparatus for slit-sealing as claimed in claim 2, and further including seal heating means for applying heat to the slit-sealed edges, said seal heating means being located to heat said slit-sealed edges as said slit-sealed edges pass over said second roller.

4. Apparatus for slit-sealing high density plastic sheets including means for holding said plastic sheets in a generally flat web, knife means engaging said web, and tensioning means for maintaining said web in tension, said knife means including a knife body, and an elongate knife blade fixed to said body and having a sharp edge, a first end of said sharp edge being above said web and a second end of said sharp edge being below said web, so that said elongate knife blade passes through the plane of said web for slitting said web, and said sharp edge forms an acute angle with the upper surface of said web, and heating means for heating said knife means sufficiently that said web is sealed while in engagement with said knife blade, said means for holding said plastic sheets in a generally flat web including a plurality of rollers, a first roller and a second roller of said plurality of rollers having tangents defining the plane of said web, a third roller of said plurality of rollers being adjacent to said first roller and spaced from the plane of said web, said tensioning means including braking means on at least one roller of said first roller and said third roller, said tensioning means further including a tensioning bar located between said first roller and said third roller, said tensioning bar being located to deflect said plastic sheets to increase the tension and curvilinear for deflecting some portions more than other portions, said some portions being aligned with said knife means, said tensioning means also including edge tensioning means adjacent to said second roller of said plurality of rollers, said edge tensioning means being located to deflect the slit edges of said web for maintaining tension in said slit edges, said apparatus further including seal heating means for applying heat to the slit-sealed edges, said seal heating means being located to heat said slit-sealed edges as said slit-sealed edges pass over said second roller.

5. Apparatus for slit-sealing as claimed in claim 4, and including a first support rod immediately beneath said web and extending transversely thereof, said first support rod being located adjacent to said sharp edge of said knife blade, and a second support rod for supporting said web between said knife means and said edge tensioning means.

* * * * *